(12) United States Patent
Finkler et al.

(10) Patent No.: US 7,823,094 B2
(45) Date of Patent: Oct. 26, 2010

(54) PSEUDO-STRING BASED PATTERN RECOGNITION IN L3GO DESIGNS

(75) Inventors: Ulrich A. Finkler, Mahopac, NY (US);
Mark A. Lavin, Katonah, NY (US);
Robert T. Sayah, Verbank, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 11/621,383

(22) Filed: Jan. 9, 2007

(65) Prior Publication Data

US 2008/0165192 A1    Jul. 10, 2008

(51) Int. Cl.
*G06F 17/50* (2006.01)

(52) U.S. Cl. .................. 716/3; 716/5; 716/2; 716/7

(58) Field of Classification Search .............. 716/5, 716/2, 3, 7
See application file for complete search history.

(56) References Cited

U.S. PATENT DOCUMENTS

6,473,881 B1   10/2002   Lehner et al.

*Primary Examiner*—Phallaka Kik
(74) *Attorney, Agent, or Firm*—Brian Verminski; Hoffman Warnick LLC (57) ABSTRACT

A system and method for processing glyph-based data associated with generating very large scale integrated circuit (VLSI) designs. A system is provide that includes a serialization system for converting an input region of glyph design data into a pseudo-string; and a pattern searching system that identifies matching patterns in the glyph design data by analyzing pseudo-strings generated by the serialization system. Pattern searching may include, e.g., predefined pattern searching and redundant pattern searching.

20 Claims, 5 Drawing Sheets

PSEUDO-STRING BASED PATTERN RECOGNITION IN L3GO DESIGNS

FIELD OF THE INVENTION

The invention relates generally to processing L3GO VLSI designs, and more specifically relates to a system and method of serializing L3GO designs and performing pattern matching.

BACKGROUND OF THE INVENTION

L3GO (Layout using Gridded Glyph Geometry Objects) is an ongoing project for improving the manufacturability of VLSI designs. L3GO provides a restricted set of objects that describes circuit connectivity and devices, referred to as glyphs. L3GO has three types of glyphs, including:

1. Stick glyphs, which are 1-dimensional line segments drawn between two grid points, e.g., used to describe FET gates or for interconnections. The attached properties of a stick glyph include which layer the stick belongs to, the start and end point, and a target width;

2. Contact glyphs, which are 0-dimensional points lying at grid points, e.g., used to describe vertical interconnections (contacts and vias). The attached properties of a contact glyph include which layer the contact belongs to, and parameters that specify how contacts are to be arranged in a matrix, e.g., the number of rows and columns in the matrix, the size of each contact, the horizontal and vertical distances between columns and rows, respectively and an optional offset of the matrix center relative to the glyph position; and 3. Area glyphs, which are 2-dimensional, axis aligned rectangles whose vertices are on grid points, e.g., used to describe diffusion regions.

In addition to their specific attributes, glyphs can carry 'design intent' attributes, e.g., net names, ratings of their importance, etc. A process called elaboration turns sets of glyphs into geometry (pre-data-prep mask shapes). A pattern describes a glyph configuration, e.g., a contact glyph with certain properties sitting on a stick glyph with another set of properties. Elaboration creates shapes for this configuration based on a set of parameters, e.g., it may create a pad on an M1 stick and four redundant vias on the pad.

The identification of predefined patterns is a key component of the elaboration process, as it significantly improves computational requirements. The possible configurations in a L3GO design are restricted compared to a shape based VLSI design. This suggests that redundant computations can be avoided through the identification of multiple placements of patterns in the design.

However, the direct description of L3GO features (points, sticks, boundary edges, etc.) as geometric objects does not lend itself to efficient recognition of patterns. Accordingly, a need exists for an efficient system for performing pattern recognition of L3GO features.

SUMMARY OF THE INVENTION

The present invention addresses the above-mentioned problems, as well as others, by providing an encoding scheme that creates pseudo-strings out of geometric computations to allow the use of efficient one-dimensional pattern recognition methods, in particular the use of a suffix tree.

In a first aspect, the invention provides a glyph-based processing system for manipulating very large scale integrated circuit (VLSI) designs, comprising: a serialization system for converting an input region of glyph design data into a pseudo-string; and a pattern searching system that identifies matching patterns in the glyph design data by analyzing pseudo-strings generated by the serialization system.

In a second aspect, the invention provides a computer program product stored on a computer usable medium for processing glyph-based data in the manipulation of very large scale integrated circuit (VLSI) designs, comprising: program code configured for converting an input region of glyph design data into a pseudo-string; and program code configured for identifying matching patterns in the glyph design data by analyzing pseudo-strings generated from the glyph design.

In a third aspect, the invention provides a method for processing glyph-based data in the manipulation of very large scale integrated circuit (VLSI) designs, comprising: providing a scan window for inputting glyph design data; locating the scan window on a selected input region; converting the input region of glyph design data into a pseudo-string; searching a suffix tree for matching suffixes of the pseudo-string; and storing matching suffixes in a repository.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
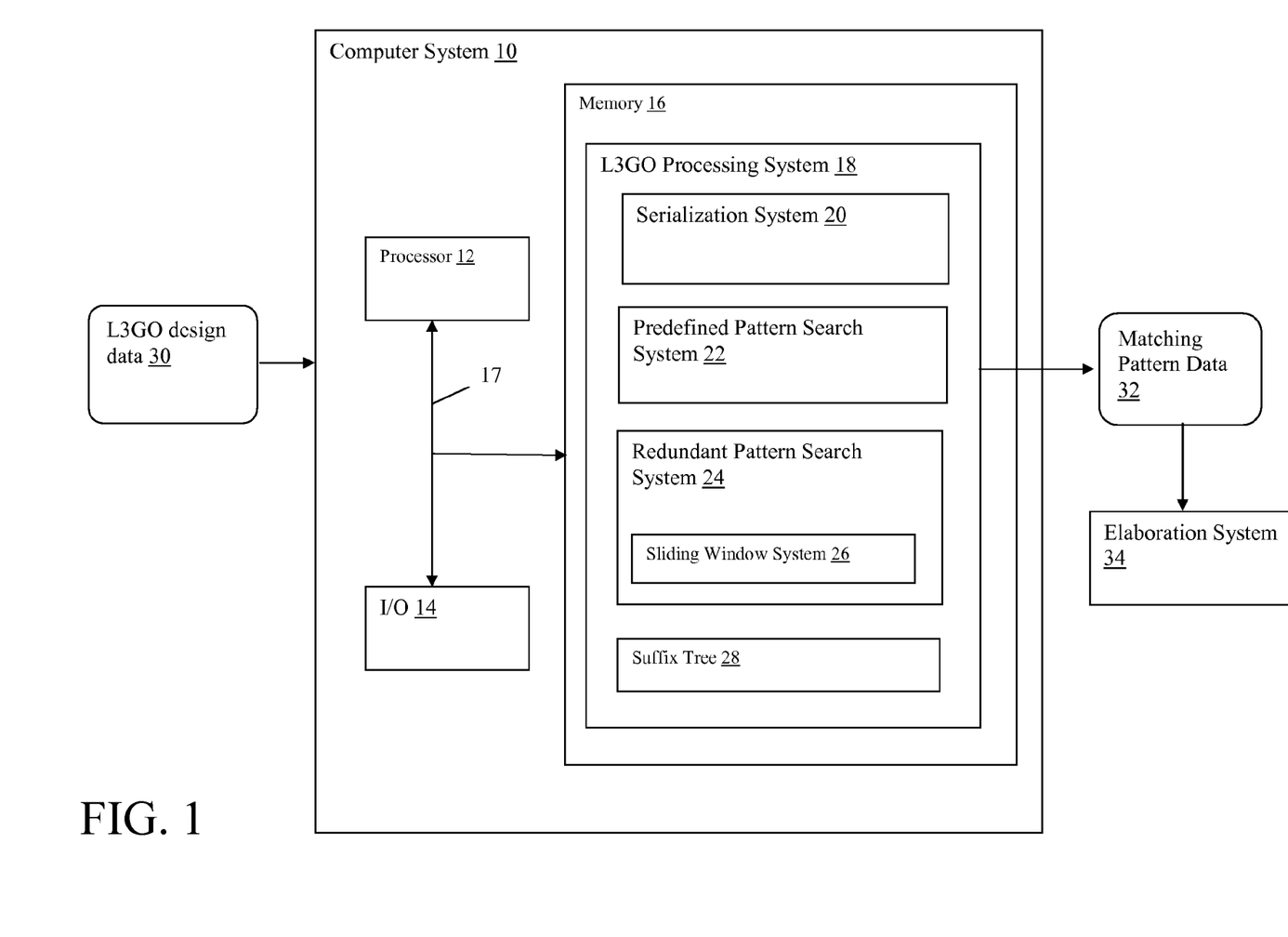
FIG. 1 depicts a computer system having an L3GO processing system in accordance with an embodiment of the present invention.

Referring now to drawings, FIG. 1 depicts a computer system 10 having an L3GO processing system 18 that analyzes L3GO design data 30 and identifies matching pattern data 32 that can improve processing performed by an elaboration system 34. Note that while L3GO processing system 18 is shown as a stand-alone process, it could be integrated into elaboration system 34. Also note that while the illustrative embodiments are described with reference to an L3GO-based system, the invention could be applied to any now known or later developed glyph-based system for generating VLSI designs.

L3GO processing system 18 includes a serialization system 20 for converting L3GO features (i.e., glyphs) into serialized data that can then be analyzed by a search facility to identify matching patterns. In this illustrative embodiment, two pattern searching systems are described, including: a predefined pattern search system 22 and a redundant pattern search system 24, which are described in further detail. Predefined pattern search system 22 identifies patterns in the L3GO design data 30 that match known patch patterns. Redundant pattern search system 24 identifies patterns that are repeated in the L3GO design data 30. It should be noted that the invention is not limited to particular pattern matching techniques, and other now known or later developed string-based searching techniques fall within the scope of this invention.

Serialization system 20 provides an encoding scheme (also referred to herein as a "glyph serialization") that creates pseudo-strings from geometric information to allow the use of efficient one-dimensional pattern recognition techniques. L3GO design data 30 comprises an ordered sequence of planes, one for each design layer. Serialization system 20 computes a pseudo-string for the contents of a region with axis parallel boundaries. To create a serialized encoding, a serialization line or axis is defined, which is chosen without loss of generality (w.l.o.g.) to be the x-axis of a coordinate system in which the pattern is defined.

Figure 2:
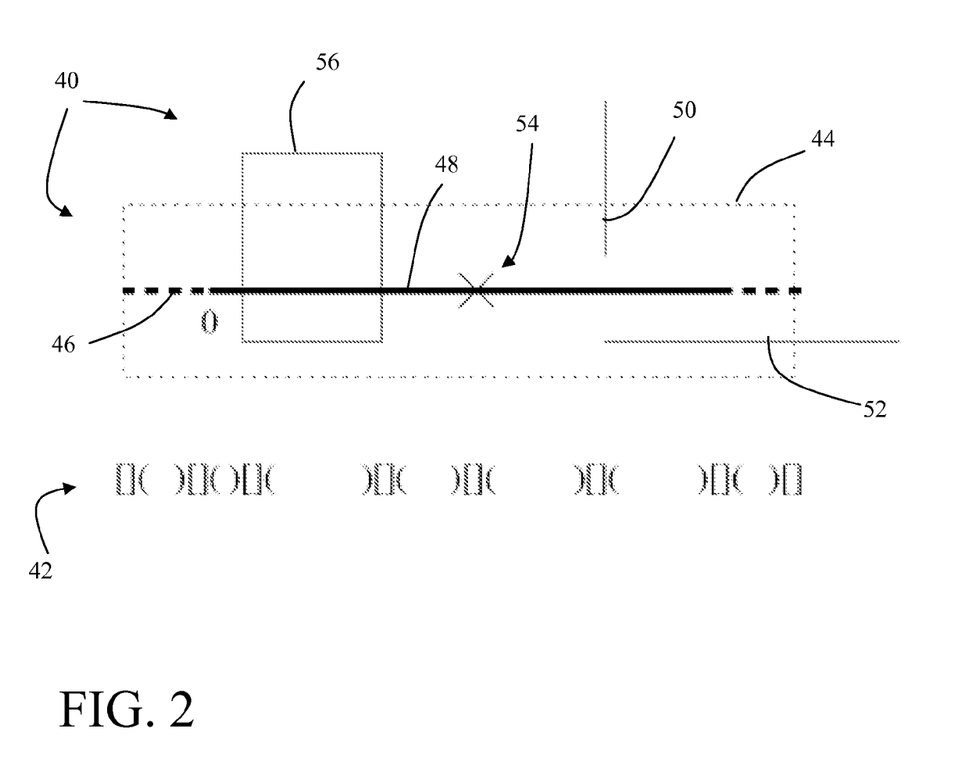
FIG. 2 depicts L3GO design data and an associated set of serialization intervals in accordance with an embodiment of the present invention.

FIG. 2 illustrates how the serialization process encodes an input region 44 of L3GO design data 40 into a pseudo-string. In this simplified example, L3GO design data 40 includes an area glyph 56, a first stick glyph 48, a second stick glyph 50, a third stick glyph 52, and a contact glyph 54. Shown below the L3GO design data 40 for illustrative purposes are a set of corresponding serialization intervals 42, which are ultimately used to define the pseudo-string for the input region 44 of L3GO design data 40. In this example, serialization intervals 42 are comprised of 15 intervals, shown herein as alternating brackets: ( ), [ ], ( ), etc. The transition between alternating bracket types correspond to L3GO glyph features in the input region 44. Each interval will ultimately be assigned information, i.e., a pseudo-character, to complete the pseudo-string.

Note that in the simplest case, the input region 44 is a rectangle. And adjacent rectangles would form adjacent input regions 44. However, as long as it is ensured that for identical contexts, identical input regions 44 are chosen, the use of sequences other than touching rectangles along the serialization line 46 is possible.

Each serialization interval 42 is the projection of a feature in the input region 44 onto the serialization line 46, i.e., each interval essentially corresponds with the location of a glyph feature along a serialization line 46 that runs through the input region 44. The serialization line 46 is typically placed along a L3GO feature, i.e., a stick glyph or a boundary edge of an area glyph. In this case, serialization line 46 is placed collinear with stick glyph 48. However, any placement of the serial line may be utilized, e.g., it could be placed through the middle of the input region 44.

Figure 3:
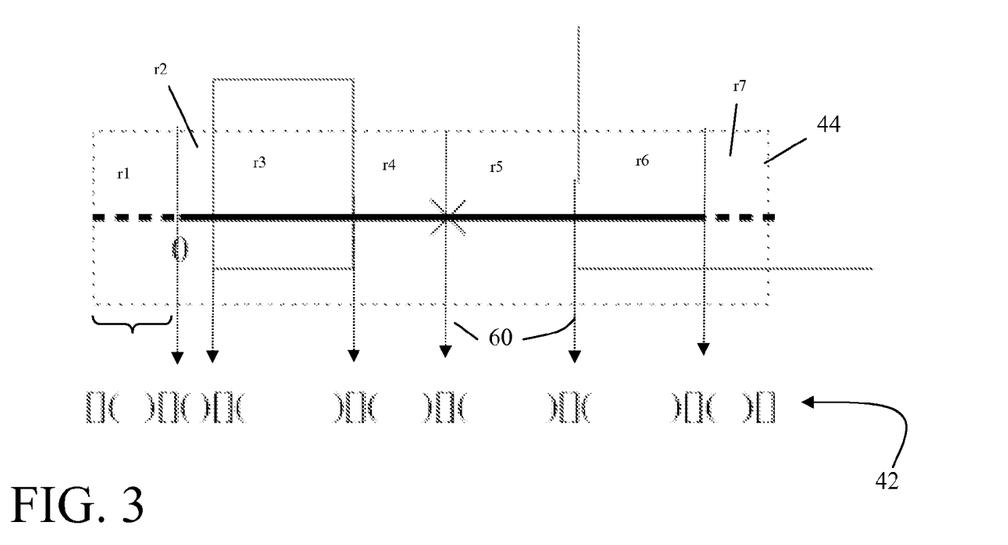
FIG. 3 depicts the L3GO design data of FIG. 2 broken down into a set of contiguous rectangles in accordance with an embodiment of the present invention.

As can be seen in FIG. 3, the L3GO features intersecting the input region 44, referred to herein as intruders, are projected orthogonally onto the serialization intervals 42 (shown with arrows 60). All projections intersecting with the serialization line form intervals as well. The projection of a contact glyph or a vertical stick glyph forms a closed interval of length zero—depicted as a square bracket "[ ]". The projection of an area glyph or a horizontal stick glyph forms an open interval of length larger than zero—depicted as round brackets "( )", as well as two closed intervals of length zero—depicted as "[ ]". If the projection of a feature onto the serialization intervals 42 is not entirely included in the serialization intervals 42, a partially open interval is formed.

The input region 44 considered for the encoding can thus be considered a sequence of touching but not overlapping rectangles along the serialization line 46. This is shown by way of example in FIG. 3, in which seven rectangles r1-r7 are delineated and formed based on the location of features in the input region 44.

Based on the set of intervals obtained by the projections, the set of intruders is encoded as a 'pseudo-string' consisting of alternating closed intervals "[ ]" of length zero and open intervals "( )" of length larger than zero. The first closed interval is always formed at the beginning of the serialization intervals 42 and the last closed interval in the encoding is formed by the end of the serialization intervals 42.

Other closed intervals are formed by projections that create intervals of length zero and the starts and ends of projections that create intervals of length larger than zero.

Given the partitioning into alternating closed and open intervals I, the 'pseudo-characters' in the pseudo-string are defined by the set of glyphs whose projections intersect a partitioning interval I. Each projection is characterized by: (1) what was projected, (2) on which level it resided and (3) its offset from the serialization line 46. An ordering convention ensures that the members of each list have a canonical linear order, and there are multiple possibilities for ordering conventions.

FIG. 2 shows an example that generates a 15 character pseudo-string. A symbol is assigned to the each of the intruders, wherein each of the symbols stands for a description as follows.

B—The glyph 48 collinear to the serialization line.
R—The area glyph 56.
X—The contact glyph 54.
V—The vertical glyph 50.
H—The horizontal glyph with offset 52.

The left end and right end of a projection are denoted with indices l and r, respectively, open segments with the plain letter. The symbol V for example could stand for the description 'y, M1, S, [), +0.3, 0.5', which denotes that the intruder is orthogonal to the serialization line (Boolean y/n)
intruder is on level M1
intruder is a stick glyph (types S,R,X)
lower end is visible, upper not
offset to serialization line is 0.3 length units and it is above in the serialization system
length of the glyph fragment considered in the pattern is 0.5 units (in this case it reaches to the border of the input region since its second end is not visible, so this number is somewhat redundant).

As noted, the pseudo-string consists of 15 pseudo-characters, c1 ... c15. The length of the interval associated with character ci is denoted with li. Each pseudo-character is characterized by the type of interval it corresponds to, the length of the interval (if it is open) and the list L of intruders whose projection intersects the interval. In the above example, the string is formed as follows:

1. [ ], 0, L={ }
2. ( ), l2, L={ }
3. [ ], 0, L={Bl}
4. ( ), l4, L={B}
5. [ ], 0, L={B,Rl}
6. ( ), l6, L={B,R}
7. [ ], 0, L={B,Rr}
8. ( ), l8, L={B}
9. [ ], 0, L={B,X}
10. ( ), l10, L={B}
11. [ ], 0, L={B,Hl, V}
12. ( ), l12, L={B,H}
13. [ ], 0, L={Br,H}
14. ( ), l14, L={H}
15. [ ], 0, :={H}

Since there is a one-to-one correspondence between the encoding and an intruder set configuration, patterns can be expressed in this pseudo-string fashion. E.g., a contact patch on an M1 rail which extends at least lx in both directions from the contact is (with B as the symbol for the rail and X the symbol for the contact):

( ), lx, L={B}
[ ], 0, L={B,X}
( ), lx, L={B} i.e., with lx<=l8 and lx<=l10, this is a substring of the glyph serialization. Note that this form of encoding can express any configuration of glyphs and shapes (the shapes have to be decomposed into rectangles and triangles in a canonical fashion with cuts parallel and vertical to the serialization line).

This process takes advantage of the fact that the design lives on a grid and the objects in a L3GO design are highly restricted. A feasible convention is that serialization lines are placed:

Along stick glyphs such that the origin is at the lower left end of the stick in the design coordinate system.

Horizontal or vertical on a point glyph such that the point glyph is in the origin.

Along an edge of a maximally connected point set such that the lower left end of the edge is in the origin.

As a further restriction, the input and output regions can be restricted to rectangles with one pair of sides parallel to the serialization line 46. Other conventions are possible, e.g., if a non-orthogonal geometry is allowed, all serialization lines have to be horizontal or vertical and the lower left end of a stick or edge has to be in the origin such that the stick or edge is in the first quadrant.

Figure 4:
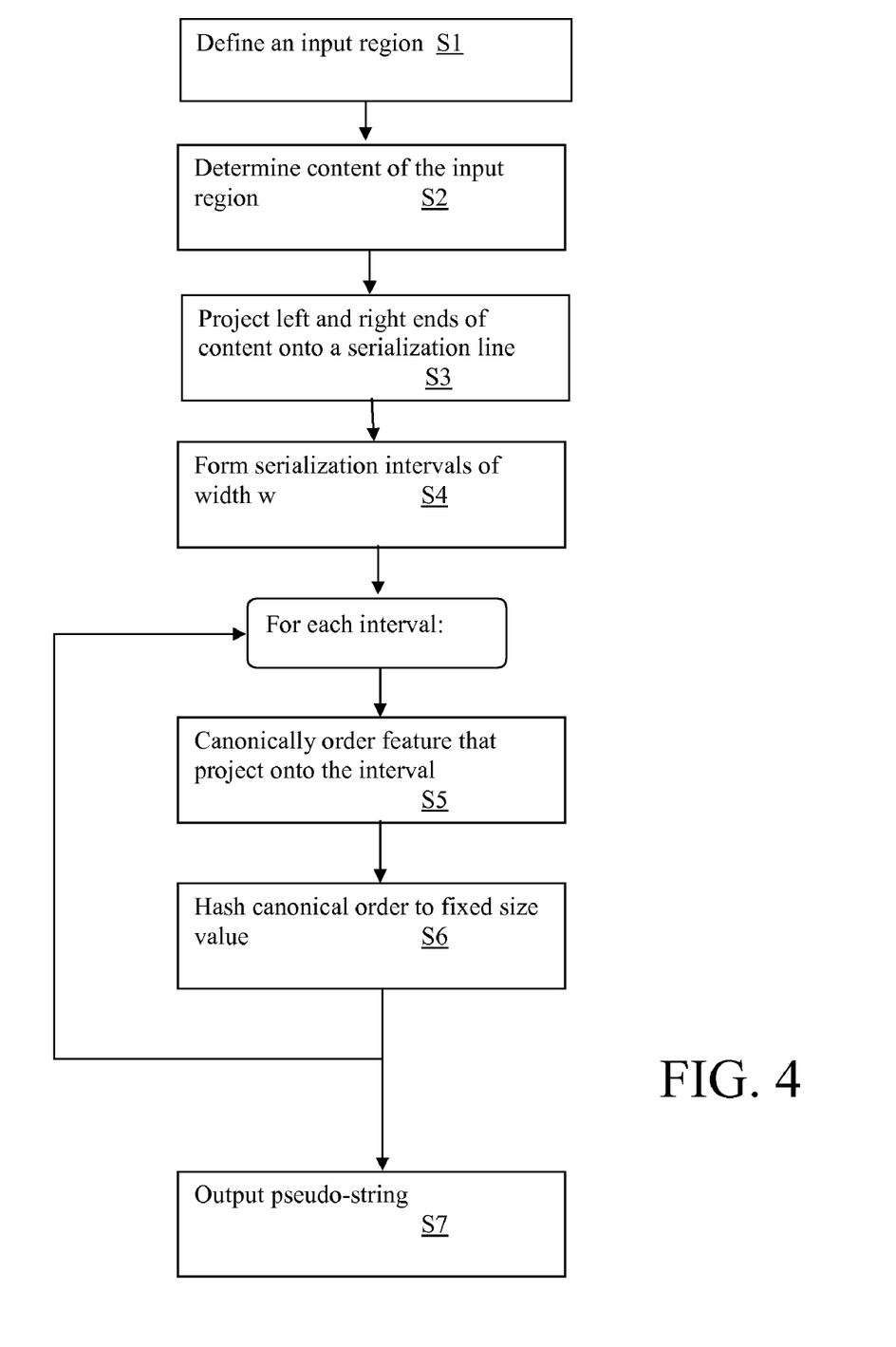
FIG. 4 depicts a flow diagram showing an illustrative process for encoding L3GO data in accordance with an embodiment of the present invention.

FIG. 4 depicts a flow diagram showing an illustrative process for encoding L3GO data. First, at step S1, an input region is defined, e.g., a window (x1,y1), (x2,y2). Next, the content, i.e., L3GO features, of the input region are determined at step S2. At step S3, the left and right ends of the input region are projected on a serialization line. In one illustrative embodiment, the serialization line is a center line, defined as (x1, (y1+y2)/2, x2, (y1+y2)/2). Next, at step S4, serialization intervals of width w are formed based on the location of the features in the input region, where w=0 for projections of end points and w>0 between projections of end points.

For each serialization interval, the following steps are taken. At step S5, features are canonically ordered that project onto the interval, and at step S6, the canonical order is hashed to a fixed size value (e.g., 32 bits). Once all of the intervals are processed, a pseudo-string is outputted at step S7.

With the ability to serialize L3GO design data 30, e.g., in a manner described above, matching pattern data 32 can be readily identified. One technique for accomplishing this involves the use of a predefined pattern search system 22 (FIG. 1). Once an input region 44 is serialized, the choice of the origin of the serialization line provides an anchor for the pattern, i.e., the origin defines characteristics of a point in the design at which such a serialization line is possible. An example is the start of an M1 stick. Depending on whether a sub-pattern search is desired or not, the pseudo-strings may be used to construct a suffix tree or trie, respectively. Suffix trees or tries (i.e., data structures capable of hold strings in a fashion that they can be efficiently searched) are known in the art, and therefore not discussed in detail herein.

The complete list of encodings also provides a list of possible anchor types. If sub-patterns are of interest, the list of possible anchor types is more general, so that it covers all characters in all patterns, not only the first characters in the patterns.

Accordingly, predefined pattern search system 22 (FIG. 1) first scans an L3GO design data for potential locations of an anchor, i.e., all points in the design that match the characteristics of possible anchor points obtained from the pattern set. At each such point, a serialization line is placed, the input region and its intruders are determined and the configuration is serialized. The pseudo-string obtained from serialization at a design location is then used to search in the suffix tree or trie to find matches.

A second technique for pattern matching involves the use of a redundant pattern matching system 24. By using the serialization scheme described above, it is also possible to find multiple occurring configurations in the L3GO design data 30.

In this approach, a scan line can be utilized to traverse through the L3GO design data 30, place serialization lines with standardized input regions at characteristic locations, e.g., at stick ends and boundary ends, and determine the intruders for each input region. The end of the serialization line can be chosen either through the length of the underlying feature or through a pre-selected value. The scan line uses an interval tree to find intrusion between parts of input regions (which are axis parallel rectangles). When the input region of a serialization line leaves the scan line, all its intruders are known.

Once all intruders for a serialization line are known, the pseudo-string is determined. Note that the same set of intruders allows the system to compute multiple pseudo-strings for input regions with decreasing size, typically width variations related to the pitch or track distance in the design.

In order to find multiple occurrences of configurations, the set of string encodings found so far is organized in a fashion that allows an efficient search for substrings. For this purpose, a suffix tree 28 may be used. A suffix tree 28 allows redundant pattern searching system 24 to find the largest prefix P of a query string q as a substring in a set of strings S stored in the suffix tree 28. The search time is O(|q|). Thus, a suffix tree 28 of all the serialization encodings in the design allows redundant pattern searching system 24 to replace multiple occurrences of the same substring with references to one copy of the substring. Typically the strings in the encoding of a VLSI design have a large degree of overlap, so that it is beneficial not to store the strings independently. Instead, it is better to find the overlaps as they are added to the suffix tree 28 and to merge overlapping strings. This reduces the size of the suffix tree 28 significantly and also allows the system to find larger patterns.

In addition, due to the large size of VLSI designs, it is not desirable to store the encoding of the entire design at once, even with the reduction obtained by the merge of overlapping strings. A sliding window system 26 (such as that used in the LZ77 compression algorithm) reduces the storage requirements. For this purpose, the suffix tree 28 is filled as the serializations are obtained from the scan line, including merging of overlapping strings. For each entry of the suffix tree 28, the rightmost coordinate of any of its contributors is maintained. An entry is dropped if the coordinate stored with a suffix tree entry is left of the scan line position by a distance w (assuming a right to left scan), the width of the sliding window.

The benefit of using a reference instead of a copy depends on how large the referenced section is and on how often it occurs. Once a substring is found whose use as a reference is beneficial in a chosen cost model, it is moved to another suffix tree 28, which permanently collects strings that contain redundantly occurring substrings. A cost model can be used to decide whether it is beneficial to add new entries to the permanent collection or to eventually use a smaller substring that is already present multiple times.

The sliding window approach requires a dynamic suffix tree, which maintains the O(N) size complexity, but not the O(N) cost complexity for the sequence of add and delete operations. But for the practical implementation, a complexity of O(S2) for the addition and deletion of an entry pointed should to be sufficient, since the string size can be limited to a constant without loosing significant benefit.

The cost model depends on how multiple occurring configurations are used. One scenario is to create additional cells and to replace the occurrences with instances of that cell. A cell requires additional resources in addition to storing the set of glyphs in question. Also, an instance requires resources. In order to make the introduction of a new cell beneficial, e.g., to reduce storage, the replacement of a set of native glyphs with an instance has to reduce the amount of resources used. Furthermore, the sum of all the savings from replacing copies of the pattern with instances has to more than compensate for the cost of the additional cell.

In another scenario, computation cost may be considered. Solutions can be computed for larger patterns and for any sub-pattern a part of this solution can be placed.

Figure 5:
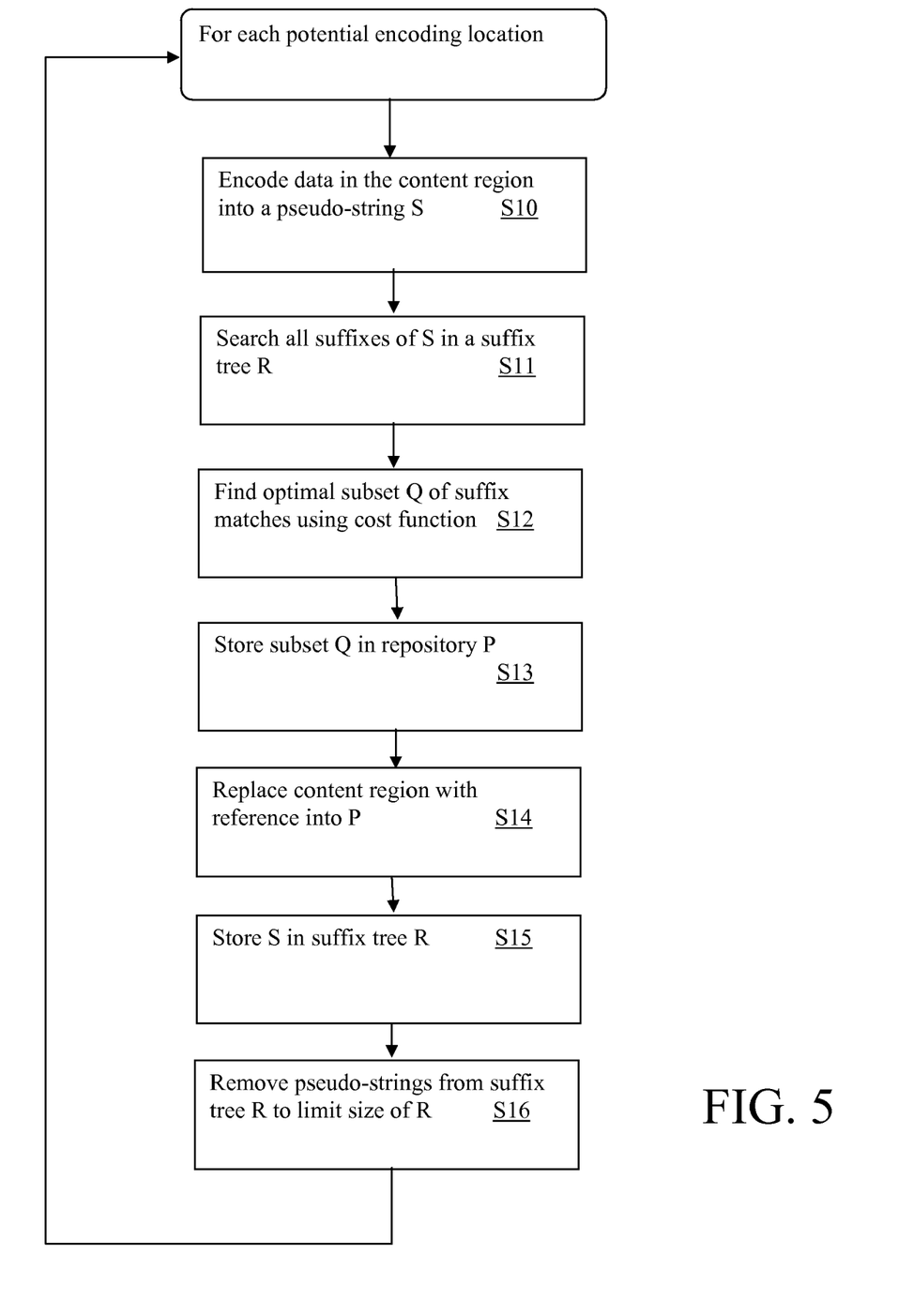
FIG. 5 depicts a flow diagram showing an illustrative process for locating matching pattern data using a sliding window in accordance with an embodiment of the present invention.

FIG. 5 depicts a flow diagram showing an illustrative process for locating matching pattern data using sliding window system 26. For each potential encoding location in L3GO design data, the following steps are taken. First at step S10, data in a content region (i.e., window) is encoded into a pseudo-string S. Next, all suffixes of S are searched in a suffix tree R at step S11. At step S12, an optimal subset Q of suffix matches are obtained using a cost function. At step S13, the subset Q is stored in a repository P and at step S14, the content region is replaced with a reference to the repository P. At step S15, the pseudo-string S is stored in the suffix tree R. Finally at step S16, previously encoded pseudo-strings, which fall outside the sliding window, are removed from the suffix tree R to limit and constrain the size of R.

In general, computer system 10 (FIG. 1) may comprise any type of computer system and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising an L3GO processing system 18 could be created, maintained and/or deployed by a service provider that offers the functions described herein for customers. That is, a service provider could offer to provide pattern matching as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A glyph-based processing system for manipulating very large scale integrated circuit (VLSI) designs, comprising:
    a serialization system for converting an input region of glyph design data into a pseudo-string; and
    a pattern searching system that identifies matching patterns in the glyph design data by analyzing pseudo-strings generated by the serialization system.

2. The glyph-based processing system of claim 1, wherein the glyph design data comprises L3GO design data.

3. The glyph-based processing system of claim 1, wherein the serialization system places a serialization line within the input region and identifies glyph features that project onto the serialization line or cross boundaries of the input region, and orthogonally projects identified glyph features into a set of serialization intervals.

4. The glyph-based processing system of claim 3, wherein each serialization interval is assigned a value that denotes: a type of interval it corresponds to, a length of the interval, and a list of glyph features that intersect the interval.

5. The glyph-based processing system of claim 1, wherein the pattern searching system comprises a predefined pattern searching system that searches for predefined patterns by comparing generated pseudo-strings with known pseudo-strings.

6. The glyph-based processing system of claim 1, wherein the pattern searching system comprises a redundant pattern search system that scans glyph design data, converts scanned data into pseudo-strings, and locates redundantly occurring patterns among the pseudo-strings.

7. The glyph-based processing system of claim 6, wherein the redundant pattern search system utilizes a suffix tree to merge and store overlapping pseudo-strings.

8. The glyph-based processing system of claim 7, wherein the redundant pattern search system further includes a sliding window system that eliminates entries in the suffix tree as associated glyph design data falls outside a scan window.

9. The glyph-based processing system of claim 8, wherein the redundant pattern search system identifies and stores optimal patterns based on a cost function.

10. A computer program product stored on a non-transitory computer readable storage medium for processing glyph-based data in a manipulation of very large scale integrated circuit (VLSI) designs when executed by a computer device, the computer program product comprising program code for:
    converting an input region of glyph design data into a pseudo-string; and
    identifying matching patterns in the glyph design data by analyzing pseudo-strings generated from the glyph design data.

11. The computer program product of claim 10, wherein the glyph design data comprises L3GO design data.

12. The computer program product of claim 10:
    wherein the converting of an input region of glyph design data into a pseudo-string places a serialization line within the input region and identifies glyph features that project onto the serialization line or cross boundaries of the input region, and orthogonally projects identified glyph features into a set of serialization intervals; and
    wherein each serialization interval is assigned a value that denotes: a type of interval it corresponds to, a length of the interval, and a list of glyph features that intersect the interval.

13. The computer program product of claim 10, wherein the identifying of matching patterns searches for predefined patterns by comparing generated pseudo-strings with known pseudo-strings.

14. The computer program product of claim 10, wherein the identifying of matching patterns scans glyph design data, converts scanned data into pseudo-strings, and locates redundantly occurring patterns among the pseudo-strings.

15. The computer program product of claim 14, wherein the identifying matching patterns:
    utilizes a suffix tree to merge and store overlapping pseudo-strings;
    eliminates entries in the suffix tree as associated glyph design data falls outside a scan window; and
    identifies and stores optimal patterns based on a cost function.

16. A method for processing glyph-based data in a manipulation of very large scale integrated circuit (VLSI) designs, comprising:
    utilizing a computer device for:
    providing a scan window for inputting glyph design data;
    locating the scan window on a selected input region;
    converting the input region of glyph design data into a pseudo-string;
    searching a suffix tree for matching suffixes of the pseudo-string; and
    storing matching suffixes in a repository.

17. The method of claim 16, further comprising relocating the scan window to a new input region.

18. The method of claim 16, further comprising providing a cost function to find an optimal set of matching suffixes.

19. The method of claim 16, wherein the pseudo-string includes a set of serialization intervals, wherein each serialization interval is assigned a value that denotes: a type of interval, a length of the interval, and a list of glyph features that intersect the interval.

20. The method of claim 16, wherein the glyph design data comprises L3GO design data.

* * * * *